United States Patent
Schimmelpenningh et al.

[11] Patent Number: 5,853,828
[45] Date of Patent: Dec. 29, 1998

[54] SAFETY GLASS STRUCTURE RESISTANT TO EXTREME WIND AND IMPACT

[75] Inventors: Julia C. Schimmelpenningh, North Brookfield; John C. Hoagland, Longmeadow, both of Mass.

[73] Assignee: Solutia Inc., St. Louis, Mo.

[21] Appl. No.: 772,919

[22] Filed: Dec. 24, 1996

[51] Int. Cl.$^6$ ........................................ B32B 9/00
[52] U.S. Cl. .................. 428/34; 428/192; 428/210; 428/215; 428/339; 428/411.1; 428/414; 428/415; 428/416; 428/425.6; 428/426; 156/107; 156/293; 52/204.595; 52/235; 52/475.1
[58] Field of Search ............... 428/426, 34, 192, 428/913, 411.1, 414, 415, 416, 210, 425.6, 215, 442, 437, 339; 52/235, 730.5, 204.597, 51, 511, 204.595, 475.1, 394; 156/107, 293, 252

[56] References Cited

U.S. PATENT DOCUMENTS

| | | | |
|---|---|---|---|
| Re. 20,430 | 6/1937 | Morrison et al. | 260/2 |
| 2,496,480 | 2/1950 | Lavin et al. | 260/73 |
| 2,631,340 | 3/1953 | Decker . | |
| 3,271,235 | 9/1966 | Lavin . | |
| 4,139,973 | 2/1979 | Fujita et al. | 52/397 |
| 4,364,209 | 12/1982 | Gebhard | 52/208 |
| 5,347,775 | 9/1994 | Santos | 52/202 |
| 5,355,651 | 10/1994 | Correia | 52/716.7 |
| 5,560,149 | 10/1996 | Lafevre | 49/501 |

FOREIGN PATENT DOCUMENTS

| | | |
|---|---|---|
| 866 239 | 7/1941 | France . |
| 2 597 857 | 10/1987 | France . |
| 2 156 413 | 10/1985 | United Kingdom . |
| 95/27119 | 10/1995 | WIPO . |

*Primary Examiner*—William Krynski
*Assistant Examiner*—Abraham Bahta
*Attorney, Agent, or Firm*—Fitzpatrick, Cella, Harper & Scinto

[57] ABSTRACT

A safety glass structure which is resistant to extreme wind- and impact-conditions. In particular, the safety glass structure comprises a frame forming an opening and defining an outer rigid channel; a laminated glass panel within the opening comprising first and second glass layers bonded to an interlayer of plasticized polyvinyl butyral; an inner rigid channel within the frame circumscribing the periphery of and bonded to said laminated glass panel by a self-sealing adhesive which permits no or minimal relative movement between the border area of the panel and said inner rigid channel; and said inner rigid channel being mounted in and bonded to the outer rigid channel with a resilient material which permits the panel to flex within its border when exposed to said extreme wind- and impact-conditions.

The safety glass structure of the present invention may be used in residential or commercial structures to preserve the integrity of the building in extreme weather conditions.

12 Claims, 1 Drawing Sheet

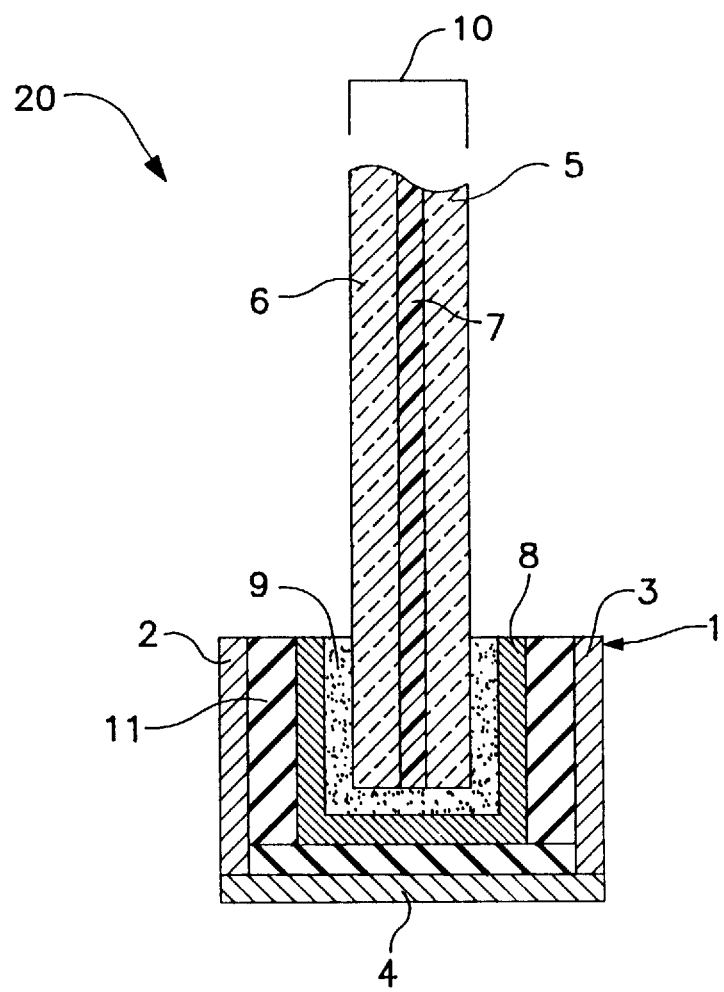

SAFETY GLASS STRUCTURE RESISTANT TO EXTREME WIND AND IMPACT

BACKGROUND OF THE INVENTION

1. Field of the Invention

This invention relates to a laminated safety glass structure useful in commercial or residential buildings and which resists extreme wind- and impact-conditions. In particular, the safety glass structure comprises a panel of conventional laminated safety glass (i.e., two layers of glass bonded to an intermediate sheet of polyvinyl butyral) whose perimeter is mounted in a rigid structural frame in such a way that the glass panel edges are rigidly held in the frame, and the overall structure is sufficiently rigid and robust to resist extremes of wind and impact. As a result, the integrity of the safety glass is preserved, even in extreme weather conditions such as hurricanes.

2. Related Background Art

Extreme weather conditions due to hurricanes, tornadoes and the like, are capable of causing immense damage to building structures and particularly windows formed of fragile glass. A hurricane is a large atmospheric vortex which can produce sustained winds of 120 miles per hour or more. As a hurricane crosses a coast and passes a building, the building experiences sustained, turbulent winds which change slowly in direction. A hurricane's sustained winds can last for hours, while its extreme gusts periodically buffet the building. As the wind direction changes slowly, the wind finds the least robust member of a structure and in the process, causes failures and generates large amounts of windborne debris.

The severe and complex nature of hurricane winds cause special problems for buildings. Winds around the roof at the exterior of the building tend to push the roof off. In addition, if the building envelope is breached through failure of a window opening, wind enters the building and tends to push the roof and walls outwards. Thus, the forces acting to lift the building roof off are effectively doubled when the building envelope has been breached.

Preservation of the integrity of window openings is also made difficult due to the presence of windborne debris. Attempts have been made to protect glass in windows by using shutters or designing the glass to remain in the opening following breakage. However, shutters or broken glass must resist sustained gusting winds which change in direction, resulting in changes in pressures from inward-acting to outward-acting (suction) as the hurricane passes. As a result of these pressure changes failure of the integrity of window openings is a common occurrence during hurricane conditions.

Prior art structures to date have not been designed to functionally resist extreme hurricane like weather conditions. U.S. Pat. No. 2,631,340 discloses a storm window construction which fits over a window opening to be sealed. U.S. Pat. No. 5,355,651 discloses a mounting arrangement for securing a pane of window glass in a frame comprising a channel-shaped flexible strip which has apertures at spaced intervals along its length. U.S. Pat. No. 4,364,209 discloses window glazing strips which snap into place in a window frame and extend around the periphery of a glass panel. The glazing strips hold the glass panel firmly in place and permit the glass panel to be easily removed for repair or replacement.

The use of shutters to protect window openings in buildings is well known, but shutters add additional expense to the construction of buildings and require attention to timely close them before the hurricane arrives. In addition, shutters are not usually feasible in large commercial buildings. For example, U.S. Pat. No. 5,347,775 discloses a hurricane shutter for windows during times of inclement weather.

Since Hurricane Andrew devastated South Florida in August 1992, engineers, architects, building officials and others in the construction industry have begun to take into consideration the hurricane as a special design situation. The sustained and turbulent nature of hurricane winds present new and important challenges to the design of safety glass structures resistant to extreme wind and impact from debris carried by the wind which have not been heretofore considered in the prior art.

SUMMARY OF THE INVENTION

Now improvements have been made in window structures containing safety glass which improve performance when exposed to extreme weather conditions such as hurricanes and the like. Accordingly, a principal objective of this invention is to provide a safety glass window structure capable of functionally resisting extreme weather conditions resulting from hurricanes, tornadoes and the like.

These and other objects are accomplished by providing a safety glass structure for residential and commercial buildings that is resistant to extreme wind- and impact-conditions which comprises:

(a) a frame forming an opening and defining an outer rigid channel;

(b) a laminated glass panel within the opening comprising first and second glass layers bonded to an interlayer of plasticized polyvinyl butyral;

(c) an inner rigid channel within the frame circumscribing the periphery of and bonded to said laminated glass panel by a self-sealing adhesive which permits no or minimal relative movement between the border area of the panel and said inner rigid channel; and (d) said inner rigid channel being mounted in and bonded to the outer rigid channel with a resilient material which permits the panel to flex within its border when exposed to said extreme wind- and impact-conditions.

BRIEF DESCRIPTION OF THE DRAWING

The drawing is a cross-sectional view of an embodiment of the safety glass structure of the present invention.

DETAILED DESCRIPTION OF THE INVENTION

Referring now to the drawing, the safety glass structure 20 comprises a rigid structural frame which, in cross-section, is in the shape of a U-shaped outer channel 1, whose side-pieces 2 and 3 and bottom-piece 4 define an opening into which a glass panel may be inserted. The particular channel shape is not critical and may vary as desired to accommodate various installations. The perimeter edge of a laminated safety glass panel 10 is mounted in an inner rigid channel 8 and bonded therein with a self-sealing adhesive 9 which permits minimal or no relative movement between the safety glass 10 and the inside of the inner rigid channel 8. The laminated safety glass panel 10 comprises first and second layers of glass 5 and 6, which may be the same or different, adhered to and encapsulating an interlayer sheet 7 of plasticized polyvinyl butyral (PVB). As shown, the inner rigid channel 8 (with its inserted safety glass) is spaced from the inside of the outer rigid channel 1 and bonded therein with a resilient material 11 which permits relative flexing movement between the outside of the inner rigid channel 8 and the inside of the outer rigid channel 1. Any flexing of the safety glass structure caused by high winds or impact from wind-borne debris is absorbed by the flexing of the glass-supporting inner channel 8 against the resilient material 11 separating the inner and outer channels.

If desired, in order to allow water or other elements to run off and not accumulate at or near the region where the glass panel 10 is inserted into the inner and outer channels 8 and 1, the safety glass structure of the present invention may optionally include any suitable material installed at that region so as to form an angle from the face of the glass to the top of the side piece of the U-shaped channel. Any conventional material may be used, such as gaskets, silicones, tapes, and the like.

The laminated safety glass panel may be any conventional laminated safety glass typically used in automobile windshields or building structures, which generally comprise two sheets of glass bonded to an interlayer of plasticized polyvinyl butyral. Polyvinyl butyral interlayers are well known in the art and these interlayers and processes for their preparation are described in U.S. Pat. No. Re. 20,430, and U.S. Pat. Nos. 2,496,480 and 3,271,235 which are hereby incorporated by reference. Preferably the plasticized polyvinyl butyral sheet is from about 90 to about 60 mils thick. Such interlayers are commercially available from Monsanto Company, St. Louis, Mo. under the trademark Saflex® sheet and from the DuPont Company, Wilmington, Del. as Butacite® sheet.

The inner rigid channel which encapsulates the periphery of the laminated safety glass panel consists of a rigid material having a cross-section which is C-, J-, or U-shaped. The edges of the inner rigid channel may be mitered or square cut. Preferably, the inner rigid channel should not overlap at any point. The inner rigid channel width, wall thickness, and wall height defining the channel may be varied as desired. The need to adjust the size and shape of the outer rigid channel to fit a particular size opening and a particular size and shape of inner rigid channel will be apparent to those skilled in the art. The laminated glass panel should be inserted a sufficient distance into the inner rigid channel so that about 0.5 inch of the periphery of each glass face is encompassed within the channel, measured from the panel edge.

The inner rigid channel may be formed of any convenient material, such as aluminum, steel, polyvinyl chloride nylon or other strong plastic. In the case of aluminum, straight cuts of aluminum may be bent into any shape and size desired. For example, two semi-circles of aluminum may be attached to cover the circumference of a piece of safety glass.

The periphery edge of the laminated safety glass panel is bonded to the inner rigid channel with a self-sealing adhesive. Preferably, the self-sealing adhesive should be flexible, have good adhesion to glass and the channel material, and harden upon curing. Preferred self-sealing adhesives are silicones, epoxies, polyurethanes, polyvinyl butyral, polysulfides, butyl sealants and/or gaskets and excess PVB interlayer material at the edges of the laminated safety glass panel. Other self-sealing adhesive known to those skilled in the art may also be used.

In the case of extruded PVB sheet, when the laminate is being constructed, the PVB interlayer sheet is normally larger than the glass sheet, when this excess PVB is present at the edges of the resulting laminate this will function as a self-sealing adhesive if the laminated panel with the excess PVB is inserted into the inner rigid channel. Generally, the laminate with the channel are autoclaved together laminating the channel to the glass with the excess PVB. Alternatively, the excess PVB at the edges of the laminate may be trimmed flush with the edges of the glass and used to fill the inner channel prior to autoclaving to bond the laminated safety glass panel to the channel.

The inner channel-mounted safety glass is then, in turn, mounted in an outer channel in a building frame in a configuration that meets industry accepted standard windload and structural requirements. Although the safety glass structure of the present invention may be used in any type of building opening of any shape, typically they are used in building openings such as windows, doors, and skylights.

The outer rigid channel of the structural frame consists of a rigid material having a cross-section which is C-shaped, U-shaped, J-shaped, or combination thereof. The outer rigid channel width, wall thickness, and wall height may be varied as required to accommodate the inner rigid channel and the need to vary the parameters of the inner rigid channel to fit a particular size opening will be apparent to those skilled in the art.

The outer rigid channel may be formed of any convenient material, such as aluminum, polyvinyl chloride "PVC", wood, or any combination or composite thereof (e.g., wood clad vinyl windows).

The inner rigid channel may be bonded in the outer rigid channel with any suitable resilient material, such as an adhesive, that has been caulked into the outer rigid channel. Examples of suitable adhesives include glazing tape, a bead of silicone, epoxies, polyurethanes, polysulfides, butyl materials, push-in-gaskets, general adhesive tape or any combination thereof.

The glass used in the safety glass structure should meet the American Standards and Test Methods "ASTM" standard specification for flat glass (ASTM C-1036-90) and the standard specification for laminated architectural flat glass (ASTM C-1172-91). The glass thickness is dependant upon windload requirements for a particular structure. The glass thickness and windload requirements are determined by the standard practice for determining the thickness of annealed glass test (ASTM E-1300) and the specified load test (American Standards for Civil Engineering "ASCE"—7-88). Exemplary examples include heat-strengthened glass, annealed glass, fully tempered glass, and chemically tempered glass. The first and second layers of glass used in safety glass laminate are each preferably from about $3/32$ to $1/2$ inch thick.

Window designs which can survive the impact of large missiles without penetration are important because this type of debris is most common around the lower portion (e.g., below 30 feet) of a building during extreme wind conditions caused by hurricanes. Also common at about 30 feet and above is roof gravel and other small debris from adjacent roofs. Should windows break under impact from these missiles, the building envelope is compromised, unless the entire broken glass remains in the opening for the remainder of the storm. However, the cyclic pressure developed by the hurricane may result in further structural damage to the building. As will be further described hereinafter, structures of the present invention survive these conditions.

Test standards have been developed to assess the qualification of products which may be used in wall cladding in hurricane-prone regions. These test standards apply to wall coverings, wall panes, windows, doors, skylights, shutters and coverings of other openings in the building envelopes.

Typical of the test standards used in coastal areas is the Southern Building Code Congress International, Inc. (Birmingham, Ala.) ("SBCCI") standard for determining impact resistance from windborne debris. In a typical test, a product is impacted by a large missile or small missile at a high velocity, depending upon the location of the product on the building elevation. Following impact, the product is subjected to cyclic pressures which represent the sustained turbulent winds of a hurricane, and the direction of the winds is changed so as to alter the direction of the pressure application from inward-acting to outward-acting (suction) to model typical hurricane conditions.

This invention will be better understood from the Examples which follow. However, one skilled in the art will readily appreciate that the specific methods and results discussed are merely illustrative of the invention and no limitation of the invention is implied. Each of the safety glass structures in the following Examples was subjected to a large missile impact test and a cyclic pressure loading test. The following is an overview of the two test methods used for testing the safety glass structures.

LARGE MISSILE IMPACT TEST

Two identical test specimens for each of the safety glass structures were tested with a large missile. The large missile comprised a piece of timber having nominal dimensions of 2 inches×4 inches weighing 9 lbs. The large missile was propelled toward the glass by a missile cannon using compressed air and impacted the surface of each test specimen at a speed of 50 ft/sec. Each test specimen received two impacts: the first within a 5 inch radius circle having its center on the midpoint of the test specimen and the second within a 5 inch radius circle in a corner having its center in a location 6 inches away from any supporting members. If the test specimens for each safety glass structure successfully passed the missile impact test (i.e., no penetration of the missile or no tear greater than 5 inches that penetrates completely through the safety glass structure), they were then subjected to the following cyclic pressure loading test.

CYCLIC PRESSURE LOADING TEST

In the cyclic pressure loading test two test specimens which successfully survived the large impact missile test were subjected to an inward-acting pressure cycle (positive pressures) in ascending order followed by an outward-acting pressure cycle (negative pressures) in descending order as listed in Table 1. These pressure cycle loads were applied through a mechanical system attached to the test specimen in order to apply uniform pressure around the structure's perimeter. Each cycle had a duration of three seconds.

TABLE 1

| Cyclic Wind Pressure Loading. | | | |
|---|---|---|---|
| Inward Acting Pressure | | Outward Acting Pressure | |
| Range | Number of cycles | Range | Number of cycles |
| 0.2 $P_{max}$ to 0.5 $P_{max}$ | 3,500 | 0.3 $P_{max}$ to 1.0 $P_{max}$ | 50 |
| 0.0 $P_{max}$ to 0.6 $P_{max}$ | 300 | 0.5 $P_{max}$ to 0.8 $P_{max}$ | 1,050 |
| 0.5 $P_{max}$ to 0.8 $P_{max}$ | 600 | 0.0 $P_{max}$ to 0.6 $P_{max}$ | 50 |
| 0.3 $P_{max}$ to 1.0 $P_{max}$ | 100 | 0.2 $P_{max}$ to 0.5 $P_{max}$ | 3,350 |

Note that $P_{max}$ denotes maximum design load in accordance with ASCE 7-88.

The test result is a pass/fail criteria. If the two test specimens for each structure reject the two missile impacts without penetration and resist the cyclic pressure loading with no crack formed longer than five inches and 1/16 inch wide through which air can pass, the particular structure was deemed to have passed the test.

EXAMPLE 1

The entire periphery of a laminated glass panel which comprised a 0.090 inch Saflex® PVB interlayer between two pieces of 1/8 inch nominal glass, was bonded into a C-shaped aluminum channel having a 1/16 inch wall thickness with a 1/16 inch to 1/8 inch bead of neutral cure silicone that had been caulked into the channel. The resulting channel mounted-laminated glass was then placed in a frame neutral test buck. The frame neutral test buck consisted of 1/4 inch angles with dimensional legs of up to 1 inch×1 inch. The angles were secured to a 2 inches×6 inches pine frame at 6 inch intervals with number 10, 1¼ inch screws. The placement width of the angle was dependant upon the overall thickness of the encapsulated glass structure and the necessary glazing components.

The samples tested were glazed into the frame neutral test buck with an additional nominal 1/8 inch heal bead of silicone on the interior side of the glass panel with a double side adhesive foam glazing tape to the exterior side of the glass panel. This configuration passed both the impact and cyclical loading at 70 pounds per square foot "psf".

EXAMPLE 2

The construction of the safety glass structure was the same as in Example 1 except that a C-shaped aluminum channel having a 1/8 inch wall thickness was bonded onto the edge of the laminated glass. This configuration passed both the impact and cyclical loading at 80 psf.

EXAMPLE 3

The construction of the safety glass structure was the same as in Example 1 except that the laminated glass comprised a piece of 3/16 inch nominal heat strengthened glass bonded on one side of a 0.090 inch Saflex® PVB interlayer and a piece of 1/8 inch nominal annealed glass bonded on the other side of the PVB. This configuration passed both the impact and cyclical loading at 80 psf.

EXAMPLE 4

The construction of the safety glass structure was the same as in Example 1 except that the laminated glass comprised a piece of 3/16 inch nominal heat strengthened glass bonded on one side of a 0.090 inch Saflex® PVB interlayer and a piece of 3/16 inch nominal annealed glass bonded on the other side of the PVB. This configuration passed both the impact and cyclical loading at 80 psf.

EXAMPLE 5

The construction of the safety glass structure was the same as in Example 1 except that the laminated glass comprised a 0.090 inch Saflex® PVB interlayer between two pieces of 1/8 inch nominal annealed glass. The laminated glass was bonded directly into the outer channel of the structure without the use of an inner channel. This configuration passed the impact test but failed the cyclical loading test at 60 psf.

During the testing of this safety glass structure, a phenomenon known as glass edge release was observed (Glass edge release occurs when the glass is no longer bound to the PVB). The small glass particles resulting from the impact test were pulled away from the PVB during the cyclic loading test and resulted in a structure failure.

EXAMPLE 6

The construction of the safety glass structure was the same as in Example 1 except that a ¼ inch nominal full tempered glass was used in place of the laminated glass. This configuration failed the impact test and therefore the cyclical loading test could not be performed.

EXAMPLE 7

The construction of the safety glass structure was the same as in Example 1 except that a ¼ inch nominal full tempered glass was bonded directly into the window channel without the use of an inner channel. This configuration failed the impact and therefore the cyclical loading test could not be performed.

The foregoing performance data under simulated external wind- and impact-conditions typically encountered in a severe hurricane dramatically illustrate the advantages of the disclosed safety glass structure. In particular, the safety glass structure of the present invention facilitates flexing of the inner channel with the safety glass within the outer channel and thus preserve the integrity of a building opening. Additionally, the safety glass structure is easily installed in the structural frames of new or older buildings which are exposed to inclement weather conditions.

What is claimed is:

1. A safety glass structure resistant to extreme wind- and impact-conditions, comprising:
   (a) a frame forming an opening and defining an outer rigid channel;
   (b) a laminated glass panel within the opening comprising first and second glass layers bonded to an interlayer of plasticized polyvinyl butyral;
   (c) an inner rigid channel within the frame circumscribing the periphery of and bonded to said laminated glass panel by a self-sealing adhesive which permits no or minimal relative movement between the border area of the panel and said inner rigid channel; and
   (d) said inner rigid channel being mounted in and bonded to the outer rigid channel with a resilient material which permits the panel to flex within its border when exposed to said extreme wind- and impact-conditions.

2. The safety glass structure of claim 1, wherein said inner rigid channel has a cross-sectional shape selected from the group consisting of C-, J-, and U-shaped.

3. The safety glass structure of claim 2, wherein said inner rigid channel is made from material selected from the group consisting of aluminum, steel, and polyvinyl chloride nylon.

4. The safety glass structure of claim 1, wherein the outer rigid channel has a cross-sectional shape selected from the group consisting of C- or U-shaped.

5. The safety glass structure of claim 4, wherein said outer rigid channel is made from material selected from the group consisting of aluminum, polyvinyl chloride, wood, or any combination thereof.

6. The safety glass structure of claim 1, wherein said self-sealing adhesive is selected from the group consisting of silicones, epoxies, polyurethanes, polyvinyl butyral, polysulfides, butyl sealants and gaskets.

7. The safety glass structure of claim 1, wherein said resilient material is an adhesive.

8. The safety glass structure of claim 7, wherein said adhesive is selected from glazing tape, silicone, epoxies, polyurethanes, polysulfides, butyl materials, push-in-gaskets, or any combination thereof.

9. The safety glass structure of claim 1, wherein said first and second layers of glass are the same or different.

10. The safety glass structure of claim 9, wherein said first and second layers of glass are selected from the group consisting of heat-strengthened glass, annealed glass, fully tempered glass, and chemically tempered glass.

11. The safety glass structure of claim 10, wherein the thickness of said first and second layers of glass are each from about 3/32 to ½ inch thick.

12. The safety glass structure of claim 1, wherein the plasticized polyvinyl butyral sheet is from about 90 to about 60 mils thick.

\* \* \* \* \*